United States Patent
Liu et al.

(10) Patent No.: US 10,659,216 B2
(45) Date of Patent: May 19, 2020

(54) DATA PROCESSING METHOD AND APPARATUS

(71) Applicant: Huawei Technologies Co., Ltd., Shenzhen (CN)

(72) Inventors: Tao Liu, Shenzhen (CN); Yu Liu, Shanghai (CN); Feifei Yin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 15/812,651

(22) Filed: Nov. 14, 2017

(65) Prior Publication Data

US 2018/0139039 A1 May 17, 2018

(30) Foreign Application Priority Data

Nov. 15, 2016 (CN) .......................... 2016 1 1021494

(51) Int. Cl.
| | |
|---|---|
| G06F 21/00 | (2013.01) |
| H04L 9/00 | (2006.01) |
| H04L 9/08 | (2006.01) |
| G09C 1/00 | (2006.01) |
| G06F 12/14 | (2006.01) |
| H04L 9/06 | (2006.01) |

(52) U.S. Cl.
CPC .......... *H04L 9/004* (2013.01); *G06F 12/1408* (2013.01); *G06F 21/00* (2013.01); *G09C 1/00* (2013.01); *H04L 9/0618* (2013.01); *H04L 9/0869* (2013.01); *H04L 9/0894* (2013.01); *G06F 2212/1052* (2013.01)

(58) Field of Classification Search
CPC ...................................................... H04L 9/004
USPC .......................................................... 713/193
See application file for complete search history.

(56) References Cited

U.S. PATENT DOCUMENTS

| | | | |
|---|---|---|---|
| 6,061,449 A | 5/2000 | Candelore et al. | |
| 7,047,453 B2 * | 5/2006 | Lappin, Jr. .............. | H04L 69/22 370/392 |

(Continued)

FOREIGN PATENT DOCUMENTS

| | | |
|---|---|---|
| CN | 1236132 A | 11/1999 |
| CN | 1836220 A | 9/2006 |

(Continued)

OTHER PUBLICATIONS

Machine Translation and Abstract of Chinese Publication No. CN103336920, Oct. 2, 2013, 9 pages.
Machine Translation and Abstract of Japanese Publication No. JP2005245531, Sep. 15, 2005, 18 pages.
Foreign Communication From a Counterpart Application, European Application No. 17201337.7, Extended European Search Report dated Apr. 3, 2018, 8 pages.

(Continued)

*Primary Examiner* — Harris C Wang
(74) *Attorney, Agent, or Firm* — Conley Rose, P.C.

(57) ABSTRACT

A data processing method and apparatus relate to the field of communications technologies and applicable to data processing used to resolve a low security problem of data stored in a memory. A memory encryption/decryption (MED) apparatus receives a data write command, encrypts to-be-written data, scrambles an address to which data is to be written, and then saves a cyclic redundancy check (CRC) code of the to-be-written data and encrypted to-be-written data in a memory according to a scrambled address to which data is to be written. Solutions provided in the embodiments of the present disclosure are.

12 Claims, 6 Drawing Sheets

(56) References Cited

U.S. PATENT DOCUMENTS

| | | | |
|---|---|---|---|
| 8,407,350 B2* | 3/2013 | Stephenson | H04L 63/029 |
| | | | 709/218 |
| 8,543,838 B1* | 9/2013 | Au | G06F 21/602 |
| | | | 713/190 |
| 2004/0101140 A1 | 5/2004 | Abe | |
| 2005/0021986 A1 | 1/2005 | Graunke et al. | |
| 2009/0113217 A1* | 4/2009 | Dolgunov | G06F 12/1408 |
| | | | 713/190 |
| 2013/0205139 A1 | 8/2013 | Walrath | |
| 2015/0293858 A1 | 10/2015 | Raam | |
| 2016/0020903 A1* | 1/2016 | de Perthuis | H04L 9/30 |
| | | | 380/44 |
| 2016/0085692 A1* | 3/2016 | Kwok | G06F 21/79 |
| | | | 713/193 |
| 2018/0139039 A1* | 5/2018 | Liu | G09C 1/00 |

FOREIGN PATENT DOCUMENTS

| | | |
|---|---|---|
| CN | 103154963 A | 6/2013 |
| CN | 103336920 A | 10/2013 |
| JP | 2005245531 A | 9/2005 |

OTHER PUBLICATIONS

Foreign Communication From a Counterpart Application, PCT Application No. PCT/CN2017/094782, International Search Report dated Nov. 3, 2017, 7 pages.

Foreign Communication From a Counterpart Application, PCT Application No. PCT/CN2017/094782, Written Opinion dated Nov. 3, 2017, 4 pages.

* cited by examiner

DATA PROCESSING METHOD AND APPARATUS

CROSS-REFERENCE TO RELATED APPLICATION

This application claims priority to Chinese Patent Application No. 201611021494.7 filed on Nov. 15, 2016, which is hereby incorporated by reference in its entirety.

TECHNICAL FIELD

The present disclosure relates to the field of communications technologies, and in particular, to a data processing method and apparatus.

BACKGROUND

As communications technologies continuously develop, information security attracts ever-increasing attention. Some important data usually needs to be encrypted before being stored in a memory. At present, an Advanced Encryption Standard (AES) algorithm is usually used to encrypt data that is to be stored in a memory.

In other approaches, when a transmit end needs to transmit data to a memory, an encryption apparatus uses the AES algorithm to encrypt the data sent by the transmit end, and saves encrypted data in the memory, that is, the memory saves data encrypted using the AES algorithm. In addition, physical addresses of the data are arranged in sequence. An attacker can perform a targeted attack on data using a corresponding physical address, or an attacker can obtain data stored in the memory by performing fault injection on the data stored in the memory. Therefore, a poor security problem still exists even though an encryption algorithm is used to encrypt data before storage.

SUMMARY

Embodiments of the present disclosure provide a data processing method and apparatus to resolve a low security problem of data stored in a memory.

To achieve the foregoing objective, the embodiments of the present disclosure use the following technical solutions.

According to a first aspect, an embodiment of the present disclosure provides a data processing method. The method is applied to a data processing system. The system includes a central processing unit (CPU), at least one advanced high-performance bus (AHB), a memory encryption/decryption (MED) apparatus, and a memory. The method includes that the MED apparatus receives a data write command, where the data write command includes to-be-written data and an address to which data is to be written, encrypts the to-be-written data, scrambles the address to which data is to be written, and then saves a cyclic redundancy check (CRC) code of the to-be-written data and encrypted to-be-written data in the memory according to a scrambled address to which data is to be written. The scrambled address to which data is to be written is used when data is stored, that is, corresponding data cannot be read according to the address to which data is to be written before scrambling, thereby avoiding a targeted attack on data. In addition, the CRC code of the to-be-written data is also stored when the to-be-written data is stored. Therefore, when a fault is injected into the data stored in the memory, a CRC check fails. When the CRC check fails, the data stored in the memory cannot be read, thereby ensuring security of encrypted data stored in the memory.

In a possible design, after the MED apparatus saves the CRC code of the to-be-written data and the encrypted to-be-written data in the memory according to the scrambled address to which data is to be written, the CPU may further read the data in the memory. A specific method is as follows. The MED apparatus receives a data read command, where the data read command includes a address from which data is to be read, reads to-be-read data and a CRC code of the to-be-read data from the memory according to the address from which data is to be read, performs a CRC check on the to-be-read data according to the CRC code that is of the to-be-read data and read from the memory, and when the CRC check succeeds, the MED apparatus sends decrypted to-be-read data to the CPU using the AHB. A CRC check needs to be performed on read data during data reading. Only data that passes the check can be read by the CPU. When the CRC check fails, the data stored in the memory cannot be read, thereby ensuring security of encrypted data stored in the memory.

In a possible design, the MED apparatus may receive a data write command forwarded by the at least one AHB. After the MED apparatus scrambles the address to which data is to be written, the MED apparatus further needs to determine a memory area to which each scrambled address to which data is to be written belongs, concurrently execute data write commands whose scrambled address to which data is to be written belong to different memory areas, and execute, in descending order of priorities, data write commands whose scrambled address to which data is to be written belong to a same memory area. It can be learned that multiple data write commands can be concurrently processed using the MED apparatus in this embodiment of the present disclosure, thereby improving data write efficiency.

In a possible design, the MED apparatus may receive a data read command forwarded by the at least one AHB. After receiving the data read command forwarded by the at least one AHB, the MED apparatus further needs to determine a memory area to which each address from which data is to be read belongs, concurrently process data read commands whose address from which data is to be read belong to different memory areas, and process, in descending order of priorities, data read commands whose address from which data is to be read belong to a same memory area. It can be learned that multiple data read commands can be concurrently processed using the MED apparatus in this embodiment of the present disclosure, thereby improving data read efficiency.

In a possible design, a method for encrypting the to-be-written data by the MED apparatus includes the following steps.

Step S1: The MED apparatus performs an exclusive OR operation on the to-be-written data and a first round key to obtain first encrypted data;

Step S2: The MED apparatus divides the first encrypted data into N groups, and concurrently performs Substitution box (S-box) processing on the N groups of data in the first encrypted data to obtain second encrypted data, where N is a positive even number greater than or equal to 2;

Step S3: The MED apparatus performs a substitution operation on the second encrypted data to obtain third encrypted data;

Step S4: The MED apparatus divides the third encrypted data into M groups, and concurrently performs linear transformation on the M groups of data in the third encrypted data using M Linear Feedback Shifting Registers (LFSRs) to obtain fourth encrypted data;

Step S5: The MED apparatus performs a shift operation on the fourth encrypted data to obtain fifth encrypted data;

Step S6: The MED apparatus performs an exclusive OR operation on the fifth encrypted data and a $(1+X)^{th}$ round key;

Step S7: Set an operation result obtained in step S6 as the first encrypted data, and cyclically perform the foregoing step S2 to step S6, where X=1 when step S6 is performed for the first time, X is increased by 1 each time step S6 is cyclically performed, and when X=Y−2, an operation result in step S6 is used as sixth encrypted data;

Step S8: The MED apparatus divides the sixth encrypted data into N groups, and concurrently performs S-box processing on the N groups of data in the sixth encrypted data to obtain seventh encrypted data;

Step S9: The MED apparatus performs a substitution operation on the seventh encrypted data to obtain eighth encrypted data; and Step S10: The MED apparatus performs an exclusive OR operation on the eighth encrypted data and a $Y^{th}$ round key to obtain encrypted to-be-written data.

In a possible design, a method for decrypting the to-be-read data by the MED apparatus may be implemented in the following steps.

Step S1: The MED apparatus performs an exclusive OR operation on the to-be-read data and the $Y^{th}$ round key to obtain first decrypted data;

Step S2: The MED apparatus performs a substitution operation on the first decrypted data to obtain second decrypted data;

Step S3: The MED apparatus divides the second decrypted data into N groups, and concurrently performs S-box processing on the N groups of data in the second decrypted data to obtain third decrypted data;

Step S4: The MED apparatus performs an exclusive OR operation on the third decrypted data and a $(Y-X)^{th}$ round key to obtain fourth decrypted data;

Step S5: The MED apparatus performs a shift operation on the fourth decrypted data to obtain fifth decrypted data;

Step S6: The MED apparatus divides the fifth decrypted data into M groups, and concurrently performs linear transformation on the M groups of data in the fifth decrypted data using M LFSRs to obtain sixth decrypted data;

Step S7: The MED apparatus performs a substitution operation on the sixth decrypted data to obtain seventh decrypted data;

Step S8: The MED apparatus divides the seventh decrypted data into N groups, and performs S-box processing on the N groups of data in the seventh decrypted data;

Step S9: The MED apparatus uses a processing result obtained in step S8 as the third decrypted data, and cyclically performs the foregoing step S4 to step S8, where X=1 when step S4 is performed for the first time, X is increased by 1 each time step S4 is performed, and when Y−X=2, a processing result in step S8 is used as eighth decrypted data; and Step S10: The MED apparatus performs an exclusive OR operation on the eighth decrypted data and the first round key to obtain the decrypted to-be-read data.

According to the foregoing encryption/decryption method, the data can be concurrently processed using eight groups of S-boxes in a data encryption/decryption process, and therefore a data processing delay can be reduced. Compared with a serial processing method used in the other approaches, a delay of the encryption/decryption process can be greatly reduced, thereby improving data encryption/decryption efficiency, and further improving performance of accessing the memory.

According to another aspect, an embodiment of the present disclosure provides a data processing apparatus. The apparatus can implement a function executed by the MED apparatus in the foregoing method example. The function may be implemented using hardware, or may be implemented by hardware executing corresponding software. The hardware or the software includes one or more modules corresponding to the foregoing function.

In a possible design, a structure of the apparatus includes a processor and a transceiver. The processor is configured to support the apparatus in executing a corresponding function in the foregoing method. The transceiver is configured to support the apparatus in communicating with another network element. The apparatus may further include a memory. The memory is configured to couple to the processor, and the memory saves a necessary program instruction and data of the apparatus.

According to still another aspect, an embodiment of the present disclosure provides a communications system. The system includes the CPU, the at least one AHB, the MED apparatus, and the memory in the foregoing aspects.

According to a yet another aspect, an embodiment of the present disclosure provides a computer storage medium configured to save a computer software instruction used by the foregoing MED apparatus, and the instruction includes a program that is designed to execute the foregoing aspects.

Compared with the other approaches, the MED apparatus in this application uses the scrambled address to which data is to be written during data storage, that is, corresponding data cannot be read according to the address to which data is to be written before scrambling, thereby avoiding a targeted attack on the data. In addition, the CRC code of the to-be-written data is also stored when the to-be-written data is stored. Therefore, when a fault is injected into the data stored in the memory, a CRC check fails. When the CRC check fails, the data stored in the memory cannot be read, thereby ensuring security of encrypted data stored in the memory. In addition, with the data encryption method in this application, security of encrypted data is further improved.

DESCRIPTION OF EMBODIMENTS

Figure 1:
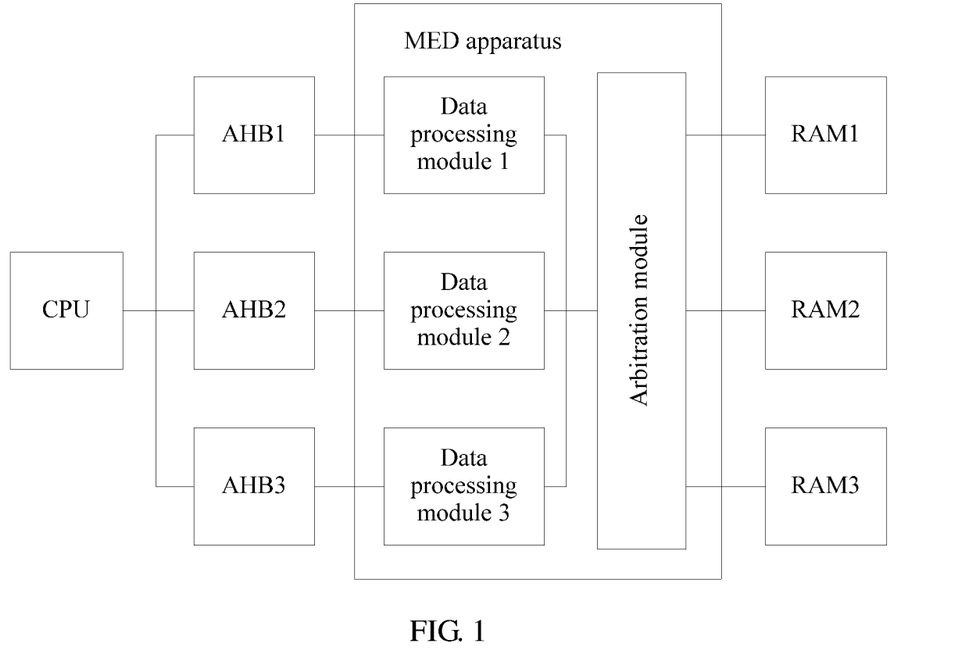
FIG. 1 is a schematic diagram of a logical structure of a data processing system according to an embodiment of the present disclosure.

To resolve a low security problem of data stored in a memory, an embodiment of the present disclosure provides a data processing method. The method is applied to a data processing system. As shown in FIG. 1, the system includes a CPU, at least one AHB (three AHBs designated as AHB1, AHB2, and AHB3 shown in FIG. 1), an MED apparatus, and a memory, where the memory includes multiple storage areas. FIG. 1 shows three storage areas, for example, a Random Access Memory RAM1 to a RAM3.

The CPU is configured to send a data read/write command for data stored in the memory.

The AHB is configured to distribute the data read/write command sent by the CPU to an interface of the MED apparatus. It should be noted that each AHB may be connected to one CPU, or multiple AHBs may be connected to multiple interfaces of one CPU. For example, the three AHBs are connected to the same CPU in FIG. 1.

The MED apparatus includes a data processing module and an arbitration module. In addition, the MED apparatus further includes multiple communications interfaces (not shown) configured to concurrently receive data read/write commands forwarded by multiple AHBs.

The data processing module is configured to convert a received data read/write command from a format of an Advanced Microcontroller Bus Architecture (AMBA) protocol into a format of a RAM interface protocol, encrypt to-be-written data, calculate a CRC code of the to-be-written data, scramble an address to which data is to be written, decrypt to-be-read data, perform a CRC check on the to-be-read data, and convert information that needs to be returned to the CPU from the RAM interface protocol to the AMBA protocol.

The memory is configured to save encrypted data.

Figure 2:
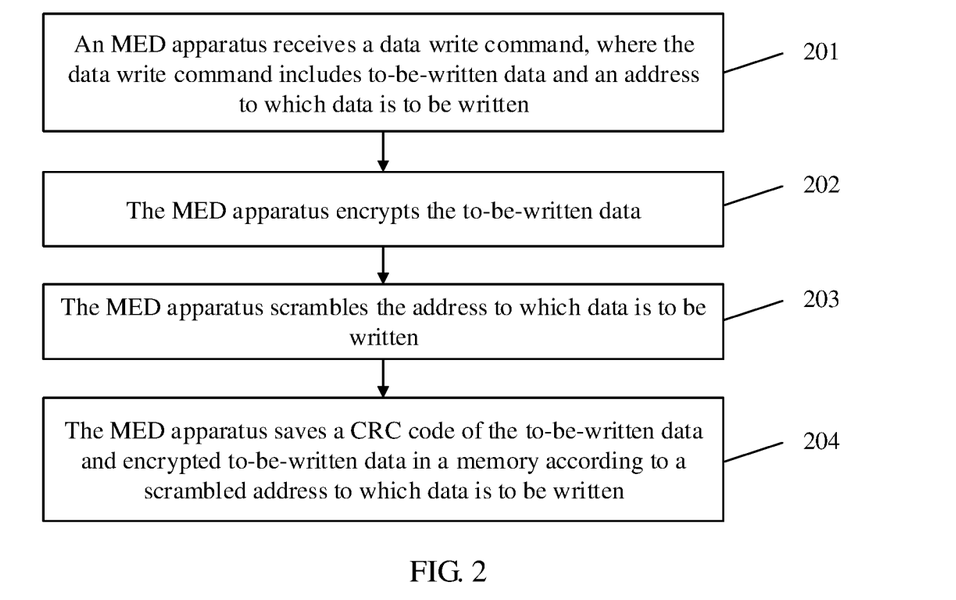
FIG. 2 is a flowchart of a data processing method according to an embodiment of the present disclosure.

With reference to the system shown in FIG. 1, an embodiment of the present disclosure provides a data processing method. As shown in FIG. 2, the method includes the following steps.

Step 201: An MED apparatus receives a data write command, where the data write command includes to-be-written data and an address to which data is to be written.

Step 202: The MED apparatus encrypts the to-be-written data.

Step 203: The MED apparatus scrambles the address to which data is to be written.

An execution sequence of step 202 and step 203 is not limited in this embodiment of the present disclosure, and an example in which step 202 is performed first is used in FIG. 2.

It should be noted that, in the other approaches, a physical address of each piece of data stored in a memory is arranged in sequence, and an attacker may find data corresponding to an address and perform a targeted attack. In this embodiment of the present disclosure, to avoid a targeted attack on data, the address to which data is to be written needs to be scrambled such that the data stored in the memory is arranged in disorder. For example, an address to which data is to be written of data A is an address A, and when being stored actually, the data A is stored in a storage area corresponding to an address B, and the address B is a scrambled address to which data is to be written. To ensure discreteness and randomness of the scrambled address to which data is to be written, pseudo-random scrambling may be performed for the address to which data is to be written using a linear feedback shift register. There is a one-to-one correspondence between the address to which data is to be written before scrambling and the scrambled address to which data is to be written, but there is no relationship between data and an actual storage address of the data. Even if the attacker obtains the data itself, the attacker cannot determine that the current data belongs to which data processing instruction, and this improves data security.

Step 204: The MED apparatus saves a CRC code of the to-be-written data and encrypted to-be-written data in a memory according to a scrambled address to which data is to be written.

It should be noted that the MED apparatus may encrypt the to-be-written data first, calculate a CRC code of the encrypted to-be-written data, and then store the encrypted to-be-written data and the CRC code of the encrypted to-be-written data in a storage area corresponding to the scrambled address to which data is to be written in the memory, or the MED apparatus may calculate the CRC code of the to-be-written data first, encrypt the to-be-written data, and then store the CRC code of the to-be-written data and the encrypted to-be-written data in a storage area corresponding to the scrambled address to which data is to be written in the memory.

According to the data processing method provided in this embodiment of the present disclosure, the MED apparatus receives the data write command, encrypts the to-be-written data, scrambles the address to which data is to be written, and then saves the CRC code of the to-be-written data and the encrypted to-be-written data in the memory according to the scrambled address to which data is to be written. In the other approaches, an attacker can perform a targeted attack on data or a fault injection on data to obtain the data stored in the memory. This results in poor data security. By comparison, in this embodiment of the present disclosure, the scrambled address to which data is to be written is used during data storage. That is, corresponding data cannot be read according to the address to which data is to be written before scrambling such that a targeted attack on the data can be prevented. In addition, the CRC code of the to-be-written data is also stored when the to-be-written data is stored. Therefore, when a fault is injected into the data stored in the memory, a CRC check fails. When the CRC check fails, the data stored in the memory cannot be read, thereby ensuring security of encrypted data stored in the memory.

Figure 3:
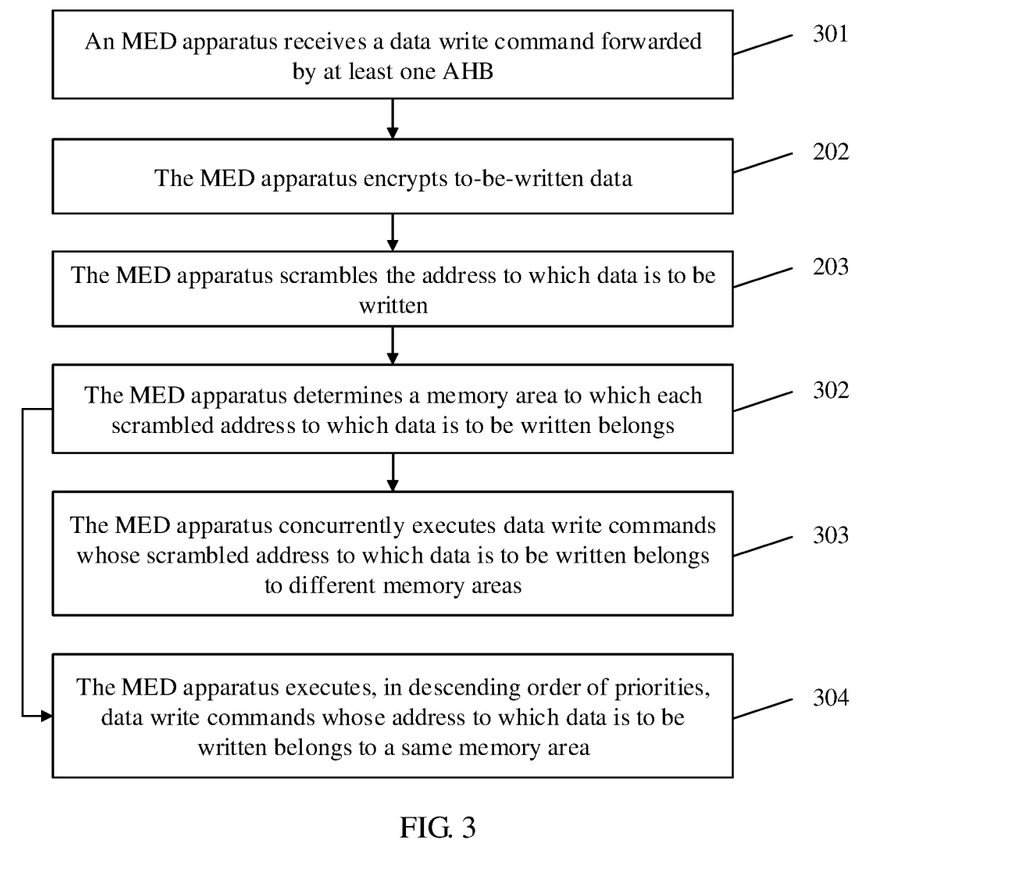
FIG. 3 is a flowchart of another data processing method according to an embodiment of the present disclosure.

It should be noted that, to improve data write efficiency, the MED apparatus in this embodiment of the present disclosure may concurrently process multiple data write commands. Therefore, in an implementation provided in this embodiment of the present disclosure, as shown in FIG. 3, step 201 that an MED apparatus receives a data write command may be further implemented in step 301.

Step 301: The MED apparatus receives a data write command forwarded by at least one AHB.

With reference to the system shown in FIG. 1, different master devices can concurrently send multiple data write commands using different AHBs, and multiple AHBs can forward the data write commands to the MED apparatus.

It should be noted that the data write command received by the MED apparatus is based on an AMBA protocol. Therefore, for subsequent processing for the data write command, a format of the data write command needs to be converted into a format of a RAM interface protocol.

Afterward, a data processing module in the MED apparatus needs to perform the foregoing step 202 and step 203, i.e., encrypting the to-be-written data, and scrambling the address to which data is to be written.

Then, step 302 to step 304 further need to be performed to complete execution of a to-be-written command.

Step 302: The MED apparatus determines a memory area to which each scrambled address to which data is to be written belongs.

With reference to the system shown in FIG. 1, after the data processing module of the MED apparatus encrypts the to-be-written data, generates a CRC code of the to-be-written data, and completes the scrambling for the address to which data is to be written, the information needs to be transmitted to an arbitration module, and then the arbitration module determines the memory area to which each scrambled address to which data is to be written belongs.

Step 303: The MED apparatus concurrently executes data write commands whose scrambled address to which data is to be written belongs to different memory areas.

If the arbitration module determines that there exist the scrambled address to which data is to be written belongs to different storage areas, encrypted to-be-written data and CRC codes of the to-be-written data may be concurrently written in storage areas corresponding to their respective scrambled address to which data is to be written.

For example, a to-be-written command A includes an address to which data is to be written A and to-be-written data A, and an address X is obtained after the address to which data is to be written A is scrambled.

A to-be-written command B includes an address to which data is to be written B and to-be-written data B, and an address Y is obtained after the address to which data is to be written B is scrambled.

A to-be-written command C includes an address to which data is to be written C and to-be-written data C, and an address Z is obtained after the address to which data is to be written C is scrambled.

The address X, the address Y, and the address Z belong to different storage areas, and the MED apparatus can concurrently write encrypted to-be-written data A, encrypted to-be-written data B, and encrypted to-be-written data C in the address X, the address Y, and the address Z respectively.

Step 304: The MED apparatus executes, in descending order of priorities, data write commands whose address to which data is to be written belongs to a same memory area.

For example, a to-be-written command D includes an address to which data is to be written D and to-be-written data D, and an address Q is obtained after the address to which data is to be written D is scrambled.

The address Q and the address A belong to a same storage area. In addition, a priority of the to-be-written command A is higher than a priority of the to-be-written command D, and in descending order of priorities, the MED apparatus needs to first write the encrypted to-be-written data A in the address X, and then write encrypted to-be-written data D in the address Q.

Figure 4:
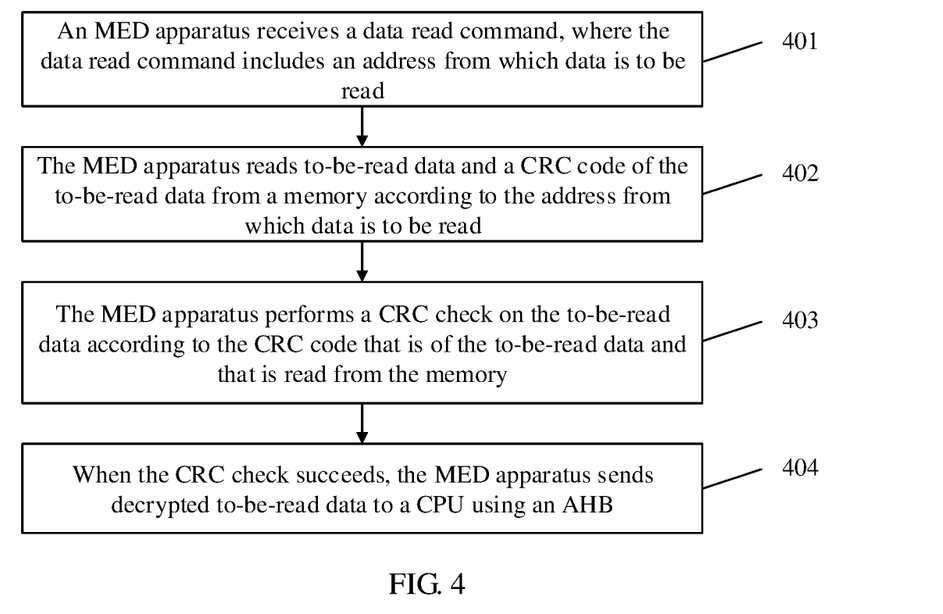
FIG. 4 is a flowchart of another data processing method according to an embodiment of the present disclosure.

The foregoing is a description of a data write method. On the basis that data has been written in a memory, an MED apparatus may further process a data read command. With reference to the system shown in FIG. 1, an embodiment of the present disclosure further provides a data processing method. As shown in FIG. 4, the method includes the following steps.

Step 401: An MED apparatus receives a data read command, where the data read command includes an address from which data is to be read.

Step 402: The MED apparatus reads to-be-read data and a CRC code of the to-be-read data from a memory according to the address from which data is to be read.

Step 403: The MED apparatus performs a CRC check on the to-be-read data according to the CRC code that is of the to-be-read data and that is read from the memory.

It should be noted that, if a CRC code of encrypted to-be-written data is written in the memory in the foregoing step 204, encrypted to-be-read data and a CRC code of the encrypted to-be-read data are read in step 402. When the CRC check is performed, the CRC code of the encrypted to-be-read data needs to be calculated first, and then the calculated CRC code is compared with the CRC code read from the memory. If the calculated CRC code is the same as the CRC code read from the memory, the CRC check succeeds. Afterward, the to-be-read data is decrypted, and step 404 is performed, that is, decrypted to-be-read data is sent to a CPU using an AHB. If the calculated CRC code is different from the CRC code read from the memory, the CRC check fails. A warning message is reported to the CPU, the system is reset, a data read operation is terminated, and all-0 data is returned to the CPU.

If a CRC code of to-be-written data before encryption is written in the memory in the foregoing step 204, encrypted to-be-read data and a CRC code of unencrypted to-be-read data are read in step 402. When the CRC check is performed, the to-be-read data needs to be decrypted first, a CRC code of decrypted to-be-read data is calculated, and then the calculated CRC code is compared with the CRC code read from the memory. If the calculated CRC code is the same as the CRC code read from the memory, the CRC check succeeds, and step 404 is performed, that is, the decrypted to-be-read data is sent to a CPU using an AHB. If the calculated CRC code is different from the CRC code read from the memory, the CRC check fails. A warning message is reported to the CPU, the system is reset, a data read operation is terminated, and all-0 data is returned to the CPU.

Step 404: When the CRC check succeeds, the MED apparatus sends decrypted to-be-read data to a CPU using an AHB.

According to the data processing method provided in this embodiment of the present disclosure, the MED apparatus receives the data read command, reads the to-be-read data and the CRC code of the to-be-read data from the memory according to the address from which data is to be read, and performs the CRC check on the to-be-read data according to the CRC code that is of the to-be-read data and that is read from the memory. When the CRC check succeeds, the MED apparatus sends the decrypted to-be-read data to the CPU using the AHB. In the other approaches, an attacker can perform a fault injection on data to obtain the data stored in the memory. This results in poor data security. By comparison, in this embodiment of the present disclosure, the CRC check needs to be performed on read data during data reading. Only data that passes the check can be read by the CPU. When the CRC check fails, the data stored in the memory cannot be read, thereby ensuring security of encrypted data stored in the memory.

Figure 5:
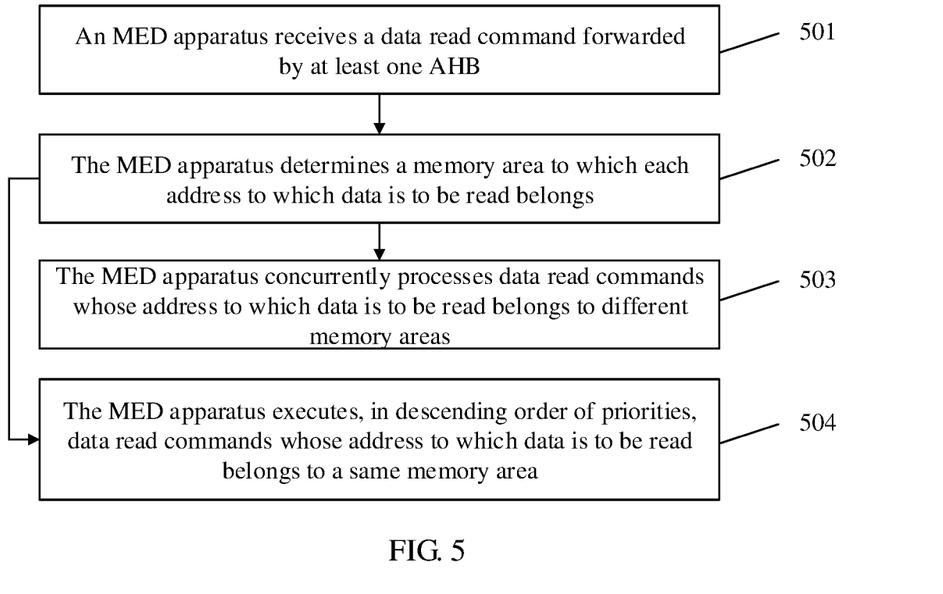
FIG. 5 is a flowchart of another data processing method according to an embodiment of the present disclosure.

To improve data read efficiency, the MED apparatus in this embodiment of the present disclosure may further concurrently process multiple data read commands. Therefore, in an implementation provided in this embodiment of the present disclosure, as shown in FIG. 5, the foregoing step 401 that the MED apparatus receives a data read command may be further implemented in step 501.

Step 501: The MED apparatus receives a data read command forwarded by at least one AHB.

With reference to the system shown in FIG. 1, the CPU can concurrently send multiple data read commands using different AHBs, and multiple AHBs can forward the data read commands to the MED apparatus.

It should be noted that the data read command received by the MED apparatus is based on an AMBA protocol. Therefore, for subsequent processing for the data read command, a format of the data read command needs to be converted into a format of a RAM interface protocol.

Then, step 502 to step 504 further need to be performed to complete execution of a to-be-read command.

Step 502: The MED apparatus determines a memory area to which each address to which data is to be read belongs.

Step 503: The MED apparatus concurrently processes data read commands whose address to which data is to be read belongs to different memory areas.

Step 504: The MED apparatus executes, in descending order of priorities, data read commands whose address to which data is to be read belongs to a same memory area.

It should be noted that for a method for processing the data read command, refer to the foregoing step 402 and step 403. Details are not described herein.

To reduce time required for a data encryption/decryption process, and improve data processing efficiency on the premise of ensuring security, an embodiment of the present disclosure uses a new data encryption/decryption algorithm. The following separately describes the data encryption algorithm and the data decryption algorithm.

Figure 6:
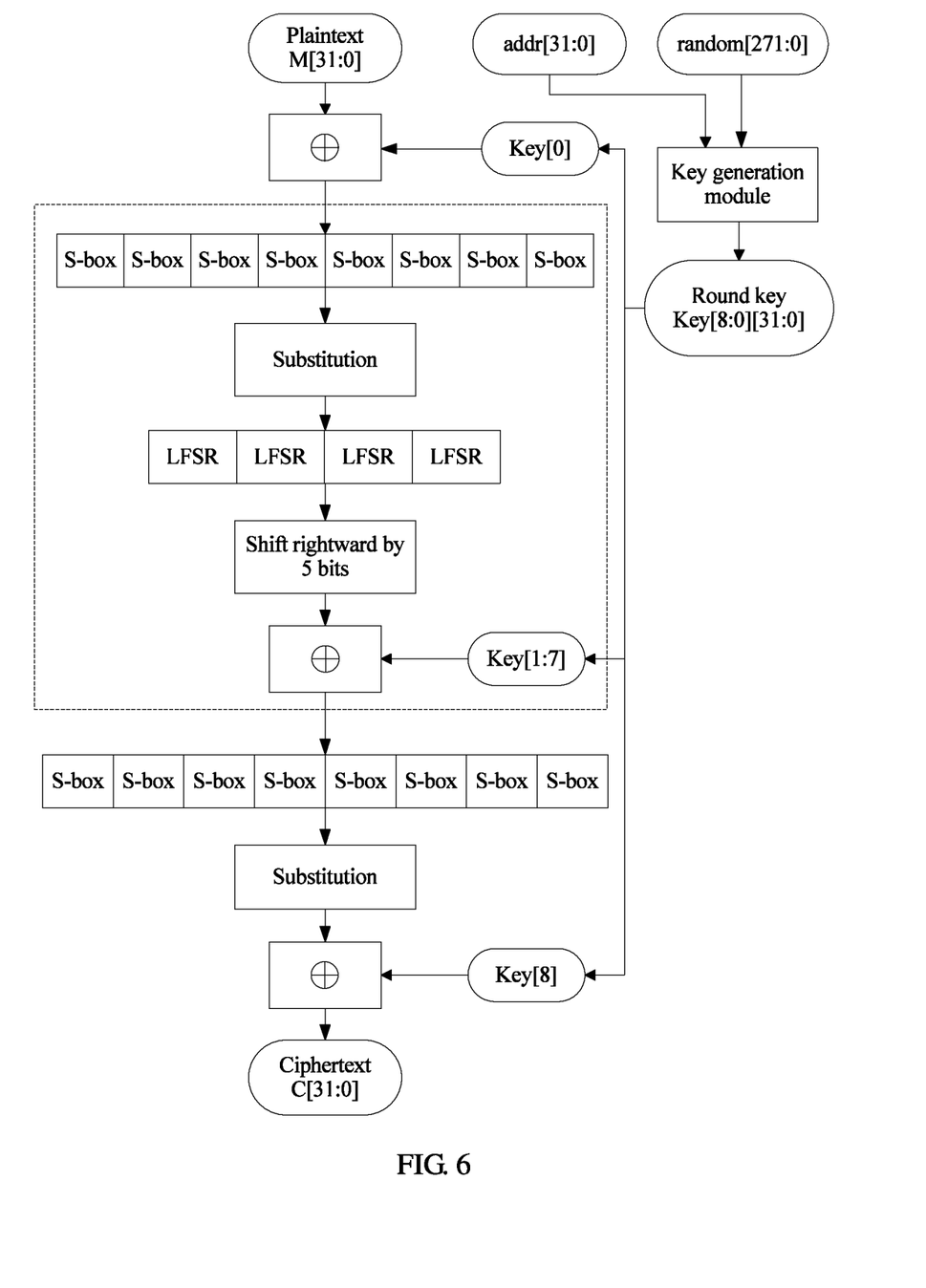
FIG. 6 is an example of a schematic diagram of a data encryption process according to an embodiment of the present disclosure.

As shown in FIG. 6, FIG. 6 is an example of a schematic diagram of a process of the foregoing step 202 that the MED apparatus encrypts the to-be-written data.

A bit width used by the encryption algorithm shown in FIG. 6 is 32 bits, addr[31:0] represents 32-bit address to which data is to be written information, random[271:0] represents a 272-bit original key, and the original key is regenerated each time the apparatus is restarted. A key generation module may generate a round key using the address to which data is to be written information and the original key.

A plaintext M[31:0] is 32-bit to-be-written data. An encryption method for the to-be-written data is as follows.

Step S1: The MED apparatus performs an exclusive OR operation on the to-be-written data and a first round key to obtain first encrypted data.

The first round key is key[0] in FIG. 6.

Step S2: The MED apparatus divides the first encrypted data into N groups, and concurrently performs S-box processing on the N groups of data in the first encrypted data to obtain second encrypted data, where N is a positive even number greater than or equal to 2.

N in FIG. 6 is 8. That is, the MED apparatus can divide the 32-bit first encrypted data into eight groups, and each group is 4 bits. S-box (i.e., which implements non-linear substitution of data) processing is concurrently performed on the eight groups of 4-bit data to obtain 32-bit second encrypted data.

Step S3: The MED apparatus performs a substitution operation on the second encrypted data to obtain third encrypted data.

It can be understood that, in the previous step, each S-box can output one group of 4-bit data, and then data output by eight S-boxes forms the 32-bit third encrypted data. In this step, arrangement sequences of data output by different S-boxes needs to be substituted. For example, a location of 4-bit data output by the first S-box and a location of 4-bit data output by the sixth S-box are substituted, and 32-bit data obtained after substitution is the third encrypted data.

Step S4: The MED apparatus divides the third encrypted data into M groups, and concurrently performs linear transformation on the M groups of data in the third encrypted data using M LFSRs to obtain fourth encrypted data.

In the example shown in FIG. 6, M=4, that is, the 32-bit third encrypted data is divided into four groups, and each group is 8 bits. Each of the four groups of data is input into one LFSR. Four LFSRs concurrently perform linear transformation on the four groups of data, and then the 32-bit fourth encrypted data is obtained.

Step S5: The MED apparatus performs a shift operation on the fourth encrypted data to obtain fifth encrypted data.

In FIG. 6, the fourth encrypted data is shifted rightward by 5 bits. That is, the last bit of the fourth encrypted data is shifted to the first bit, and then the current last bit is shifted to the first bit until the original last but four bits are shifted to the first bit in order to obtain the fifth encrypted data.

Step S6: The MED apparatus performs an exclusive OR operation on the fifth encrypted data and a $(1+X)^{th}$ round key.

Step S7: Set an operation result obtained in step S6 as the first encrypted data, and cyclically perform the foregoing step S2 to step S6, where X=1 when step S6 is performed for the first time, X is increased by 1 each time step S6 is cyclically performed, and when X=Y−2, an operation result in step S6 is used as sixth encrypted data.

With reference to FIG. 6, a process in a dashed-line box in FIG. 6 needs to be cyclically performed.

It can be understood that, when step S6 is performed for the first time, the MED apparatus performs an exclusive OR operation on the fifth encrypted data and a second round key, and when step S6 is performed for the second time, the MED apparatus performs an exclusive OR operation on the fifth encrypted data and a third round key. Y=8 is used as an example in FIG. 6, and therefore when step S6 is performed for the last time, the MED apparatus performs an exclusive OR operation on the fifth encrypted data and a seventh round key to obtain the sixth encrypted data.

Step S8: The MED apparatus divides the sixth encrypted data into N groups, and concurrently performs S-box processing on the N groups of data in the sixth encrypted data to obtain seventh encrypted data.

N in FIG. 6 is 8.

Step S9: The MED apparatus performs a substitution operation on the seventh encrypted data to obtain eighth encrypted data.

Step S10: The MED apparatus performs an exclusive OR operation on the eighth encrypted data and a $Y^{th}$ round key to obtain encrypted to-be-written data.

Y in FIG. 6 is 8, and key[8] in FIG. 6 is an eighth round key. The encrypted to-be-written data is a ciphertext C[31:0] in FIG. 6.

A data decryption process is contrary to a data encryption process. A method for decrypting to-be-read data by the MED apparatus may be further implemented in the following steps.

Step S1: The MED apparatus performs an exclusive OR operation on the to-be-read data and the $Y^{th}$ round key to obtain first decrypted data.

It should be noted that a round key generated when the to-be-read data is decrypted is the same as the round key generated when the to-be-read data is encrypted.

Corresponding to the example in the data encryption method, Y=8, that is, the MED apparatus performs an exclusive OR operation on the to-be-read data and the eighth round key to obtain the first decrypted data.

Step S2: The MED apparatus performs a substitution operation on the first decrypted data to obtain second decrypted data.

The substitution operation means adjusting a sequence of 32-bit data.

Step S3: The MED apparatus divides the second decrypted data into N groups, and concurrently performs S-box processing on the N groups of data in the second decrypted data to obtain third decrypted data.

Step S4: The MED apparatus performs an exclusive OR operation on the third decrypted data and a $(Y-X)^{th}$ round key to obtain fourth decrypted data.

When step S4 is performed for the first time, the MED apparatus performs an exclusive OR operation on the third decrypted data and the seventh round key, when step S4 is performed for the second time, the MED apparatus performs an exclusive OR operation on the third decrypted data and the sixth round key, and when step S4 is performed for the last time, the MED apparatus performs an exclusive OR operation on the third decrypted data and the second round key.

Step S5: The MED apparatus performs a shift operation on the fourth decrypted data to obtain fifth decrypted data.

Step S6: The MED apparatus divides the fifth decrypted data into M groups, and concurrently performs linear transformation on the M groups of data in the fifth decrypted data using M LFSRs to obtain sixth decrypted data.

Corresponding to the data encryption process, M may be 4.

Step S7: The MED apparatus performs a substitution operation on the sixth decrypted data to obtain seventh decrypted data.

Step S8: The MED apparatus divides the seventh decrypted data into N groups, and performs S-box processing on the N groups of data in the seventh decrypted data.

Step S9: The MED apparatus uses a processing result obtained in step S8 as the third decrypted data, and cyclically performs the foregoing step S4 to step S8, where X=1 when step S4 is performed for the first time, X is increased by 1 each time step S4 is cyclically performed, and when Y−X=2, a processing result in step S8 is used as eighth decrypted data.

Step S10: The MED apparatus performs an exclusive OR operation on the eighth decrypted data and the first round key to obtain decrypted to-be-read data.

In this embodiment of the present disclosure, the data can be concurrently processed using eight groups of S-boxes in the data encryption/decryption process, and therefore a data processing delay can be reduced. Compared with a serial processing method used in the other approaches, a delay of the encryption/decryption process can be greatly reduced, thereby improving data encryption/decryption efficiency, and further improving performance of accessing the memory.

The foregoing describes solutions provided in the embodiments of the present disclosure mainly from a perspective of interaction between network elements. It can be understood that to achieve the foregoing functions, each network element, such as the MED apparatus, includes a corresponding hardware structure and/or software module for implementing each function. A person of ordinary skill in the art should be easily aware that, the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

In an embodiment of the present disclosure, function module division may be performed on the MED apparatus according to the foregoing method example. For example, each function module may be obtained by means of division according to a corresponding function, or two or more functions may be integrated into one processing module. The integrated module may be implemented in a form of hardware, or may be implemented in a form of a software function module. It should be noted that the module division in this embodiment of the present disclosure is an example, and is merely logical function division. There may be another division manner in an actual implementation.

Figure 7:
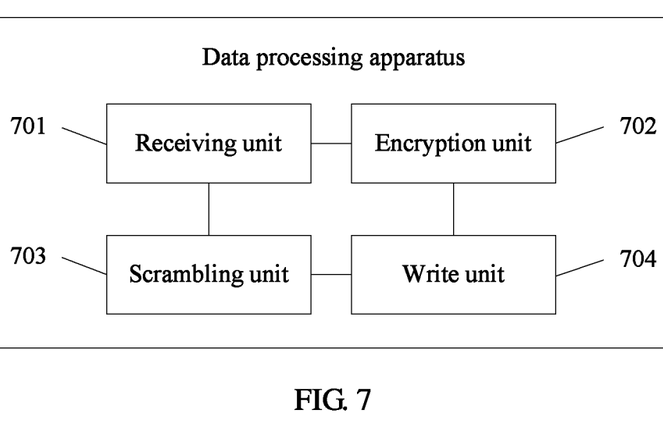
FIG. 7 is a schematic diagram of a logical structure of a data processing apparatus according to an embodiment of the present disclosure.

An embodiment of the present disclosure provides a data processing apparatus. The apparatus may be the MED apparatus in the foregoing embodiment. As shown in FIG. 7, FIG. 7 shows a possible schematic structural diagram of an apparatus used in the foregoing embodiment, such as the MED apparatus. The apparatus includes a receiving unit 701, an encryption unit 702, a scrambling unit 703, and a write unit 704. The receiving unit 701 is configured to support the MED apparatus in performing step 201 in FIG. 2, step 301 in FIG. 3, step 401 in FIG. 4, and step 501 in FIG. 5. The encryption unit 702 is configured to support the MED apparatus in performing step 202 in FIG. 2 and step 202 in FIG. 3. The scrambling unit 703 is configured to support the MED apparatus in performing step 203 in FIG. 2 and step 203 in FIG. 3, and the write unit 704 is configured to support the MED apparatus in performing step 204 in FIG. 2 and step 303 and step 304 in FIG. 3.

Figure 8:
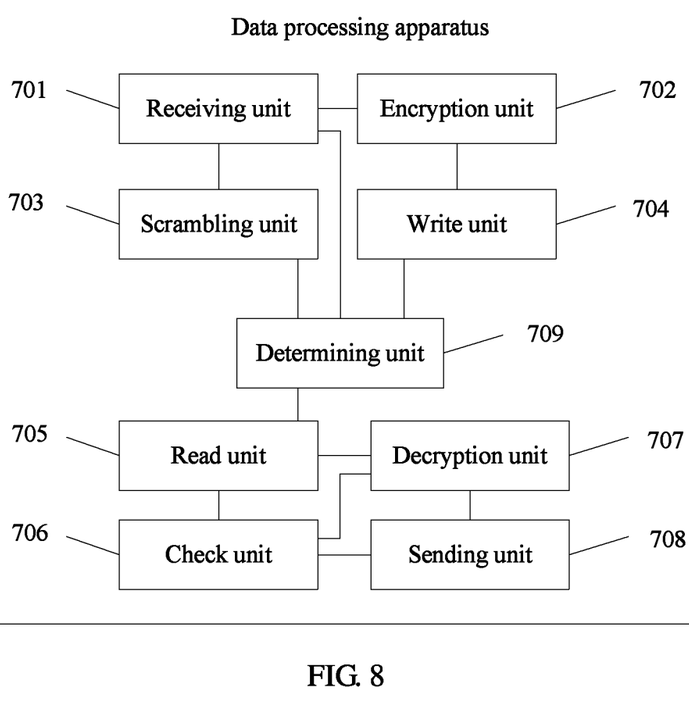
FIG. 8 is a schematic diagram of a logical structure of another data processing apparatus according to an embodiment of the present disclosure.

In addition, as shown in FIG. 8, the apparatus further includes a read unit 705, a check unit 706, a decryption unit 707, a sending unit 708, and a determining unit 709. In addition, the apparatus may further include a processing unit (not shown). Functions of the read unit 705, the check unit 706, the decryption unit 707, and the sending unit 708 may be integrated into the processing unit. The read unit 705 is configured to support the MED apparatus in performing step 402 in FIG. 4. The check unit 706 is configured to support the MED apparatus in performing step 403 in FIG. 4. The sending unit 708 is configured to support the MED apparatus in performing step 404 in FIG. 4, and the determining unit 709 is configured to support the MED apparatus in performing step 302 in FIG. 3 and step 502 in FIG. 5.

All related content of all steps in the foregoing method embodiments may be quoted to functional descriptions of corresponding function modules. Details are not described herein.

Figure 9:
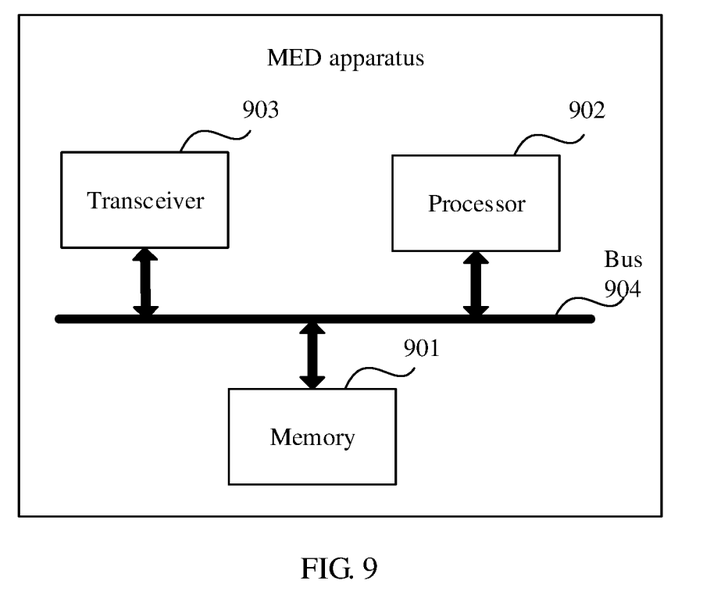
FIG. 9 is a schematic diagram of a logical structure of an MED apparatus according to an embodiment of the present disclosure.

As shown in FIG. 9, FIG. 9 shows a possible schematic structural diagram of the MED apparatus used in the foregoing embodiment. The MED apparatus includes a processor 902, a transceiver 903, a memory 901, and a bus 904. The memory 901 may be integrated into the processor 902, or may be separated from the processor 902. The transceiver 903, the processor 902, and the memory 901 are interconnected using the bus 904. The bus 904 may be a Peripheral Component Interconnect (PCI) bus or an extended industry standard architecture (EISA) bus, or the like. The bus 904 may be classified into an address bus, a data bus, a control bus, and the like. For ease of denotation, only one bold line is used in FIG. 9 for denotation, but it does not indicate that there is only one bus or one type of bus. The processor 902 is configured to control and manage an action of the MED apparatus. The transceiver 903 is configured to support the MED apparatus in communicating with another network entity, for example, communicating with a function module or a network entity shown in FIG. 1. The memory 901 is configured to save program code and data of the MED apparatus.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly, for related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a RAM.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method, applied to a data processing system comprising a central processing unit (CPU), coupled to an advanced high-performance bus (AHB), a memory encryption/decryption (MED) apparatus, and a memory, wherein the method comprises the MED apparatus performing the steps of:
    receiving a data write command from the AHB, wherein the data write command comprises to-be-written data and addresses to which the to-be-written data is to be written;
    encrypting the to-be-written data;
    scrambling the addresses to which the to-be-written data is to be written;
    determining a memory area corresponding to each scrambled address;
    concurrently executing data write commands for scrambled addresses corresponding to different memory areas, and executing data write commands in descending order of priorities for scrambled addresses corresponding to a same memory area;
    saving a cyclic redundancy check (CRC) code of the to-be-written data and the encrypted to-be-written data in the memory according to the scrambled addresses;
    receiving a data read command comprising an address from which to-be-read data is to be read;
    reading the to-be-read data and a CRC code of the to-be-read data from the memory according to the address from which the to-be-read data is to be read;
    performing a CRC check on the to-be-read data according to the CRC code of the to-be-read data read from the memory;
    decrypting the to-be-read data; and
    sending the decrypted to-be-read data to the CPU using the AHB when the CRC check succeeds.

2. The data processing method of claim 1, wherein receiving the data read command comprises receiving the data read command from the AHB, and wherein, the method further comprises:
    determining a memory area corresponding to each address from which the to-be-read data is to be read after receiving the data read command;
    concurrently processing data read commands for addresses corresponding to different memory areas, and processing in descending order of priorities, data read commands for addresses corresponding to a same memory area.

3. The data processing method of claim 2, wherein the method further comprises the MED apparatus, before sending the decrypted to-be-read data to the CPU using the AHB;
    performing a first exclusive OR operation on the to-be-written data and a first round key to obtain first encrypted data;
    dividing the first encrypted data into N groups of data, and concurrently performing substitution box (S-box) process on the N groups of data in the first encrypted data to obtain second encrypted data, wherein N is a positive even number greater than or equal to 2;
    performing a substitution operation on the second encrypted data to obtain third encrypted data;
    dividing the third encrypted data into M groups of data, and concurrently performing linear transformation on the M groups of data in the third encrypted data using M Linear Feedback Shifting Registers (LFSRs) to obtain fourth encrypted data;
    performing a shift operation on the fourth encrypted data to obtain fifth encrypted data;
    performing a second exclusive OR operation on the fifth encrypted data and a $(1+X)^{th}$ round key;
    setting an operation result obtained after performing the second exclusive OR operation as the first encrypted data, and cyclically performing the foregoing step of dividing the first encrypted data into the N groups of data and the step of performing the second exclusive OR operation, wherein X=1 when the second exclusive OR operation is performed for the first time, wherein X is increased by 1 each time the second exclusive OR operation is cyclically performed, and wherein an operation result of the second exclusive OR operation is used as sixth encrypted data when X=Y−2;
    dividing the sixth encrypted data into N groups of data, and concurrently performing the S-box process on the N groups of data in the sixth encrypted data to obtain seventh encrypted data;
    performing a substitution operation on the seventh encrypted data to obtain eighth encrypted data; and
    performing a third exclusive OR operation on the eighth encrypted data and a $Y^{th}$ round key to obtain the encrypted to-be-written data.

4. The data processing method of claim 3, wherein decrypting the to-be-read data comprises the MED apparatus:
    performing a fourth exclusive OR operation on the to-be-read data and the $Y^{th}$ round key to obtain first decrypted data;
    performing a substitution operation on the first decrypted data to obtain second decrypted data;

dividing the second decrypted data into N groups of data, and concurrently performing the S-box process on the N groups of data in the second decrypted data to obtain third decrypted data;

performing a fifth exclusive OR operation on the third decrypted data and a $(Y-X)^{th}$ round key to obtain fourth decrypted data;

performing a shift operation on the fourth decrypted data to obtain fifth decrypted data;

dividing the fifth decrypted data into M groups of data, and concurrently performing linear transformation on the M groups of data in the fifth decrypted data using M LFSRs to obtain sixth decrypted data;

performing a substitution operation on the sixth decrypted data to obtain seventh decrypted data;

dividing the seventh decrypted data into N groups of data, and performing the S-box process on the N groups of data in the seventh decrypted data;

setting a processing result obtained after performing the S-box process on the N groups of data in the seventh decrypted data as the third decrypted data, and cyclically performing the foregoing step of performing the fifth exclusive OR operation to the step of dividing the seventh decrypted data into N groups of data, and performing the S-box process on the N groups of data in the seventh decrypted data, wherein X=1 when the fifth exclusive OR operation is performed for the first time, wherein X is increased by 1 each time the fifth exclusive OR operation is performed, and wherein a processing result of performing the S-box process on the N groups of data in the seventh decrypted data is used as eighth decrypted data when Y−X=2; and performing a sixth exclusive OR operation on the eighth decrypted data and the first round key to obtain the decrypted to-be-read data.

5. A data processing apparatus, applied to a memory encryption/decryption (MED) apparatus, comprising:
a receiver configured to:
receive a data write command from an advanced high-performance bus (AHB), wherein the data write command comprises to-be-written data and addresses to which the to-be-written data is to be written;
provide the data write command to a processor coupled to the receivers
receive a data read command, wherein the data read command comprises addresses from which to-be-read data is to be read; and
provide the data read command to the processor,
wherein the processor is configured to:
encrypt the to-be-written data;
scramble the addresses to which the to-be-written data is to be written;
determine a memory area corresponding to each scrambled address;
concurrently execute data write commands for scrambled addresses corresponding to different memory areas, and execute data write commands in descending order of priorities for scrambled addresses corresponding to a same memory area;
save, according to the scrambled address to which the to-be-written data is to be written, a cyclic redundancy check (CRC) code of the to-be-written data and the encrypted to-be-written data in the memory;
read the to-be-read data and a CRC code of the to-be-read data from the memory according to the address from which the to-be-read data is to be read;
perform a CRC check on the to-be-read data according to the CRC code of the to-be-read data read from the memory;
decrypt the to-be-read data; and
a transmitter configured to send the decrypted to-be-read data to a central processing unit (CPU) using the AHB when the CRC check succeeds.

6. The data processing apparatus of claim 5, wherein the receiver is further configured to receive the data read command received from the AHB, wherein the processor is further configured to:
determine a memory area corresponding to each address from which the to-be-read data is to be read;
concurrently process data read commands for addresses corresponding to different memory areas, and process, in descending order of priorities, data read commands for addresses corresponding to a same memory area.

7. The data processing apparatus of claim 6, wherein the processor is further configured to:
perform a first exclusive OR operation on the to-be-written data and a first round key to obtain first encrypted data;
divide the first encrypted data into N groups of data, and concurrently perform substitution box (S-box) process on the N groups of data in the first encrypted data to obtain second encrypted data, wherein N is a positive even number greater than or equal to 2;
perform a substitution operation on the second encrypted data to obtain third encrypted data;
divide the third encrypted data into M groups of data, and concurrently perform linear transformation on the M groups of data in the third encrypted data using M Linear Feedback Shifting Registers (LFSRs) to obtain fourth encrypted data;
perform a shift operation on the fourth encrypted data to obtain fifth encrypted data;
perform a second exclusive OR operation on the fifth encrypted data and a $(1+X)^{th}$ round key;
set an operation result obtained after performing the second exclusive OR operation as the first encrypted data, and cyclically perform the foregoing steps of dividing the first encrypted data into the N groups of data and performing the second exclusive OR operation, wherein X=1 when the second exclusive OR operation is performed for the first time, wherein X is increased by 1 each time the second exclusive OR operation is cyclically performed, and wherein an operation result of the second exclusive OR operation is used as sixth encrypted data when X=Y−2;
divide the sixth encrypted data into N groups of data, and concurrently perform the S-box process on the N groups of data in the sixth encrypted data to obtain seventh encrypted data;
perform a substitution operation on the seventh encrypted data to obtain eighth encrypted data; and
perform a third exclusive OR operation on the eighth encrypted data and a $Y^{th}$ round key to obtain the encrypted to-be-written data.

8. The data processing apparatus of claim 7, wherein the processor is further configured to:
perform a fourth exclusive OR operation on the to-be-read data and the $Y^{th}$ round key to obtain first decrypted data;

perform a substitution operation on the first decrypted data to obtain second decrypted data;
divide the second decrypted data into N groups of data, and concurrently perform the S-box process on the N groups of data in the second decrypted data to obtain third decrypted data;
perform a fifth exclusive OR operation on the third decrypted data and a $(Y-X)^{th}$ round key to obtain fourth decrypted data;
perform a shift operation on the fourth decrypted data to obtain fifth decrypted data;
divide the fifth decrypted data into M groups of data, and concurrently perform linear transformation on the M groups of data in the fifth decrypted data using M LFSRs to obtain sixth decrypted data;
perform a substitution operation on the sixth decrypted data to obtain seventh decrypted data;
divide the seventh decrypted data into N groups of data, and perform the S-box process on the N groups of data in the seventh decrypted data;
set a processing result obtained after performing the S-box process on the N groups of data in the seventh decrypted data as the third decrypted data, and cyclically perform the foregoing step of performing the fifth exclusive OR operation step of dividing the seventh decrypted data into N groups of data, and performing the S-box process on the N groups of data in the seventh decrypted data, wherein X=1 when the fifth exclusive OR operation is performed for the first time, wherein X is increased by 1 each time the fifth exclusive OR operation is cyclically performed, and wherein a processing result of performing the S-box process on the N groups of data in the seventh decrypted data is used as eighth decrypted data when Y−X=2; and
perform a sixth exclusive OR operation on the eighth decrypted data and the first round key to obtain the decrypted to-be-read data.

9. A computer program product comprising a non-transitory computer readable storage medium storing program code thereon for data processing, the program code comprising instructions, that when executed, cause a memory encryption/decryption (MED) apparatus to:
receive a data write command from an advanced high-performance bus (AHB), wherein the data write command comprises to-be-written data and an address to which the to-be-written data is to be written;
encrypt the to-be-written data;
scramble the address to which the to-be-written data is to be written;
determine a memory area corresponding to each scrambled address;
concurrently execute data write commands for scrambled addresses corresponding to different memory areas, and execute data write commands in descending order of priorities for scrambled addresses corresponding to a same memory area;
save a cyclic redundancy check (CRC) code of the to-be-written data and the encrypted to-be-written data in the memory according to the scrambled address to which the to-be-written data is to be written;
receive a data read command comprising an address from which the to-be-read data is to be read;
read the to-be-read data and a CRC code of the to-be-read data from the memory according to the address from which the to-be-read data is to be read;
perform a CRC check on the to-be-read data according to the CRC code of the to-be-read data read from the memory;
decrypt the to-be-read data; and
send the decrypted to-be-read data to a processor using the AHB when the CRC check succeeds.

10. The computer program product of claim 9, wherein receiving the data read command comprises receiving the data read command received from AHB, and wherein after receiving the data read command from the AHB, the instructions cause the MED to:
determine a memory area corresponding to each address from which the to-be-read data is to be read belongs;
concurrently process data read commands for addresses corresponding to different memory areas, and process in descending order of priorities, data read commands for addresses corresponding to a same memory area.

11. The computer program product of claim 10, wherein before sending the decrypted to-be-read data to the processor using the AHB, the instructions cause the MED to:
perform a first exclusive OR operation on the to-be-written data and a first round key to obtain first encrypted data;
divide the first encrypted data into N groups of data, and concurrently perform substitution box (S-box) process on the N groups of data in the first encrypted data to obtain second encrypted data, wherein N is a positive even number greater than or equal to 2;
perform a substitution operation on the second encrypted data to obtain third encrypted data;
divide the third encrypted data into M groups of data, and concurrently performing linear transformation on the M groups of data in the third encrypted data using M Linear Feedback Shifting Registers (LFSRs) to obtain fourth encrypted data;
perform a shift operation on the fourth encrypted data to obtain fifth encrypted data;
perform a second exclusive OR operation on the fifth encrypted data and a $(1+X)^{th}$ round key;
set an operation result obtained after performing the second exclusive OR operation as the first encrypted data, and cyclically performing the foregoing step of dividing the first encrypted data into the N groups of data and the step of performing the second exclusive OR operation, wherein X=1 when the second exclusive OR operation is performed for the first time, wherein X is increased by 1 each time the second exclusive OR operation is cyclically performed, and wherein an operation result of the second exclusive OR operation is used as sixth encrypted data when X=Y−2;
divide the sixth encrypted data into N groups of data, and concurrently performing the S-box process on the N groups of data in the sixth encrypted data to obtain seventh encrypted data;
perform a substitution operation on the seventh encrypted data to obtain eighth encrypted data; and
perform a third exclusive OR operation on the eighth encrypted data and a $Y^{th}$ round key to obtain the encrypted to-be-written data.

12. The computer program product of claim 11, wherein decrypting the to-be-read data comprises:
performing a fourth exclusive OR operation on the to-be-read data and the $Y^{th}$ round key to obtain first decrypted data;
performing a substitution operation on the first decrypted data to obtain second decrypted data;

dividing the second decrypted data into N groups of data, and concurrently performing the S-box process on the N groups of data in the second decrypted data to obtain third decrypted data;

performing a fifth exclusive OR operation on the third decrypted data and a $(Y-X)^{th}$ round key to obtain fourth decrypted data;

performing a shift operation on the fourth decrypted data to obtain fifth decrypted data;

dividing the fifth decrypted data into M groups of data, and concurrently performing linear transformation on the M groups of data in the fifth decrypted data using M LFSRs to obtain sixth decrypted data;

performing a substitution operation on the sixth decrypted data to obtain seventh decrypted data;

dividing the seventh decrypted data into N groups of data, and performing the S-box process on the N groups of data in the seventh decrypted data;

setting a processing result obtained after performing the S-box process on the N groups of data in the seventh decrypted data as the third decrypted data, and cyclically performing the foregoing step of performing the fifth exclusive OR operation and the step of dividing the seventh decrypted data into N groups of data, and performing the S-box process on the N groups of data in the seventh decrypted data, wherein $X=1$ when the fifth exclusive OR operation is performed for the first time, wherein X is increased by 1 each time the fifth exclusive OR operation is performed, and wherein a processing result of performing the S-box process on the N groups of data in the seventh decrypted data is used as eighth decrypted data when $Y-X=2$; and performing a sixth exclusive OR operation on the eighth decrypted data and the first round key to obtain the decrypted to-be-read data.

* * * * *